United States Patent [19]

Oinoue et al.

[11] 4,223,348
[45] Sep. 16, 1980

[54] AUTOMATIC FOCUSSING DEVICE

[75] Inventors: Kenichi Oinoue; Shohei Nagai, both of Tokyo, Japan

[73] Assignee: Olympus Optical Co., Ltd., Tokyo, Japan

[21] Appl. No.: 940,660

[22] Filed: Sep. 8, 1978

[30] Foreign Application Priority Data

Sep. 12, 1977 [JP] Japan ............................. 52-108908
Apr. 12, 1978 [JP] Japan ............................. 53-42077

[51] Int. Cl.$^2$ ............................................. H04N 5/76
[52] U.S. Cl. .................... 358/128.5; 179/100.3 V
[58] Field of Search ............ 250/201; 179/100.3 V, 179/100.3 G; 358/128

[56] References Cited

U.S. PATENT DOCUMENTS

| | | | |
|---|---|---|---|
| 3,992,574 | 11/1976 | Bouwhuis et al. | 179/100.3 V |
| 4,025,949 | 5/1977 | Whitman | 179/100.3 V |
| 4,118,736 | 10/1978 | Okada et al. | 358/128 |
| 4,123,652 | 10/1978 | Bouwhuis | 358/128 |

*Primary Examiner*—Stuart N. Hecker
*Attorney, Agent, or Firm*—Haseltine, Lake & Waters

[57] ABSTRACT

An automatic focussing device which functions to bring a video disc surface in focus with an optical system is disclosed. The device comprises a hologram for producing a focussing luminous flux having astigmatism with or without coma and a video signal reading out luminous flux without having astigmatism with or without coma, a relay lens having an optimum image forming plane, and an objective lens arranged such that said optimum image forming plane and said video disc surface are conjugate with respect to said objective lens.

5 Claims, 21 Drawing Figures

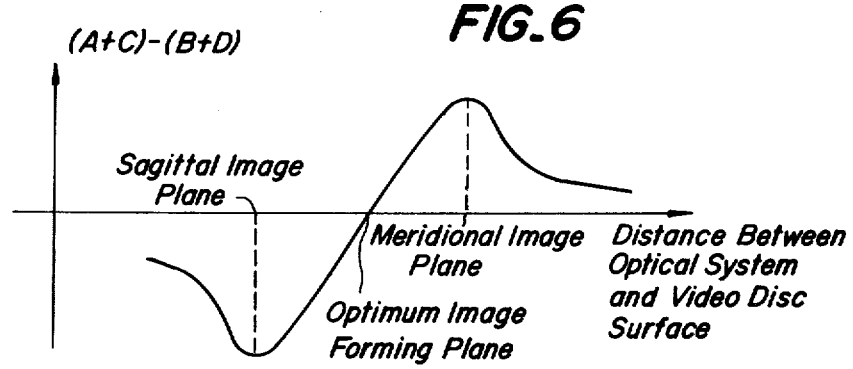
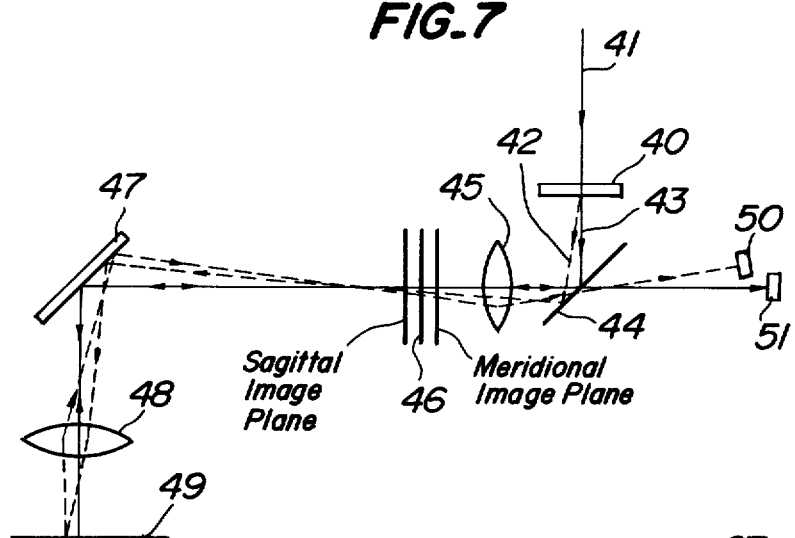
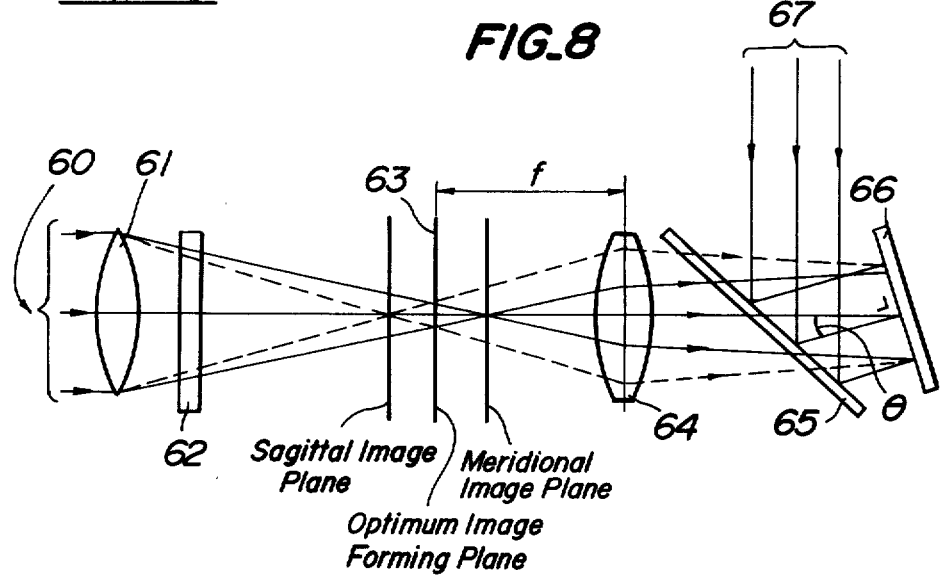

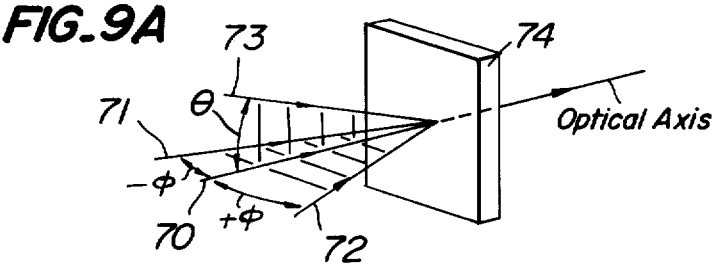
FIG.9A
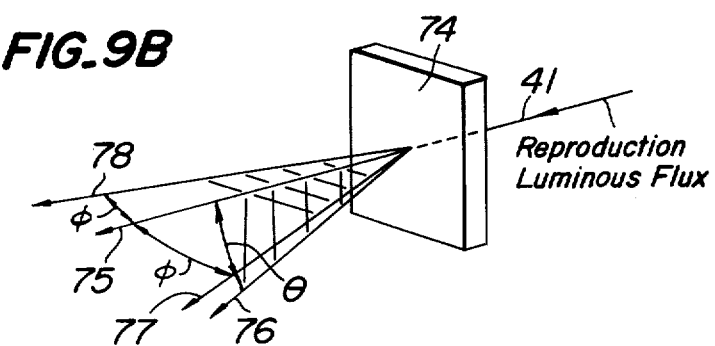
FIG.9B
FIG.10A
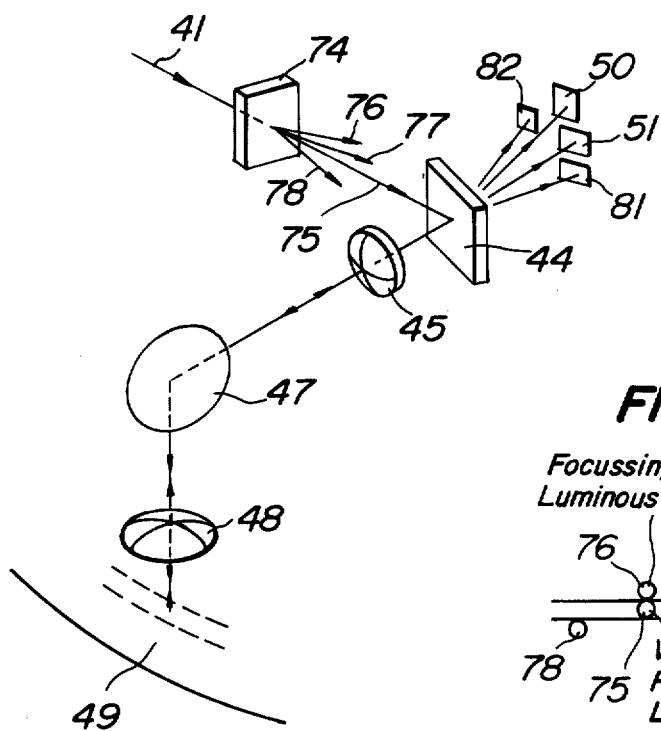
FIG.10B
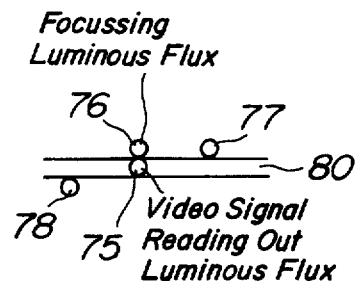

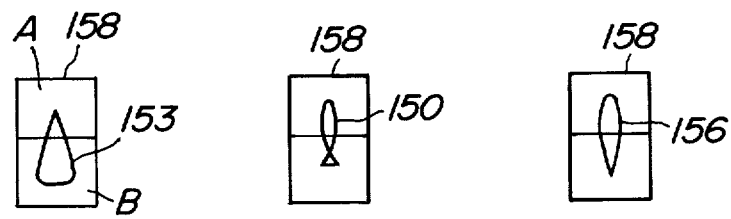
FIG._13A  FIG._13B  FIG._13C
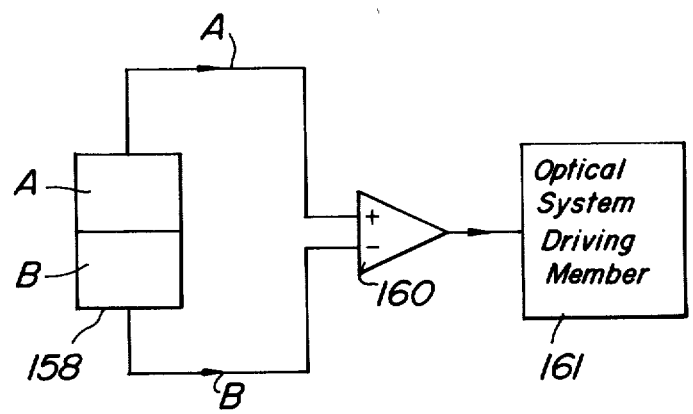
FIG._14
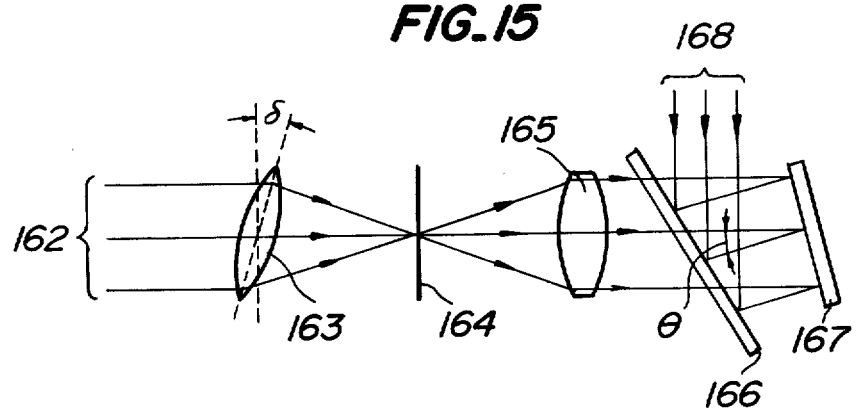
FIG._15

AUTOMATIC FOCUSSING DEVICE

BACKGROUND OF THE INVENTION

1. Field of the Invention

This invention relates to an automatic focussing device for objects to be recorded or reproduced such, for example, as a video disc.

2. Description of the Prior Art

In a video disc recording or reproduction apparatus, a recording or reading out luminous flux must be converged onto a video disc surface. In this case, provision must be made of an automatic focussing device which functions to bring an optical system for converging the above mentioned luminous flux onto the video disc surface in focus with the video disc surface.

Such kinds of automatic focussing devices have heretofore been proposed. In one device, a focussing luminous flux passes through an optical system and is reflected by a video disc surface and the configuration of the image reflected by the video disc surface is detected. The optical system is intentionally subjected to astigmatism and change of the configuration of the image reflected by the video disc surface in response to the position of the video disc surface is utilized to effect the focussing.

For example, an automatic focussing device for video disc in which is made of a cylindrical lens for the purpose of generating astigmatism has been proposed. In such conventional device, a luminous flux emitted from a light source passes through a half mirror and objective lens and is converged onto a video disc surface as a reading out beam of the luminous flux. A light reflected by the video disc surface passes through the cylindrical lens and is converged onto a detector. If the position of the video disc surface is changed, the above mentioned astigmatism of the cylindrical lens causes the configuration of the image produced on the detector to be changed. By detecting the change of such image configuration on the detector, it is possible to detect the change in position of the video disc surface and to always locate the video disc surface at a given position with respect to the optical system. Such conventional automatic focussing device has the disadvantage that the adjustment of the position of the detector is critical, and that the detection sensitivity is low.

In addition, another automatic focussing device in which astigmatism is produced on a luminous flux to be converged onto the video disc surface has also been proposed. Such conventional device, however, has the disadvantage that the astigmatism causes the light image converted onto the video disc surface to be enlarged, thereby rendering the reading out such enlarged light image difficult.

SUMMARY OF THE INVENTION

An object of the invention, therefore, is to provide an automatic focussing device for objects to be recorded or reproduced, which can obviate the above mentioned disadvantages which have been encountered with the prior art techniques, i.e. which can effect focussing in a highly precise manner, which can provide accurate reading out or recording beam of luminous flux, which can freely select the position of a detector, and which is easily adjustable.

A feature of the invention is the provision of an automatic focussing device comprising a hologram for producing a luminous flux having a considerably large astigmatism with or without coma;

a relay lens for converging said luminous flux with an astigmatic difference $\Delta l$ and having an optimum image forming surface;

a video disc surface to be recorded or reproduced;

an objective lens arranged between said optimum image forming surface and said video disc surface and converging said luminous flux as a focussing luminous flux with a small astigmatic difference onto said video disc surface with a small astigmatic difference, said optimum image forming surface and said video disc surface being conjugate in position with respect to said objective lens; and a focussing light receiving element on which is incident a light reflected by said video disc surface and passed through said objective lens and relay lens as a luminous flux having a considerably large astigmatic difference.

BRIEF DESCRIPTION OF THE DRAWING

FIG. 6 is a graph which illustrates the relation between a focal point detection signal obtained by the electrical circuit shown in FIG. 5 and a distance between an optical system and a video disc surface;

FIG. 7 is a cross-sectional view of one embodiment of an automatic focussing device according to the invention;

FIG. 8 is a cross-sectional view of an optical system for manufacturing a hologram used in the automatic focussing device shown in FIG. 7;

FIG. 9A is a perspective view of a photosensitive body to be manufactured into a hologram used in another embodiment of an automatic focussing device;

FIG. 9B is a perspective view of the hologram shown in FIG. 9A;

FIG. 10A is a perspective view of another embodiment of an automatic focussing device which makes use of the hologram shown in FIG. 9B according to the invention;

FIG. 10B is a diagrammatic view which illustrates one example of light spots produced on the video disc surface shown in FIG. 10A;

FIGS. 13A, 13B and 13C are front elevational views of one example of a detector for detecting an astigmatic and coma image;

FIG. 14 is a block diagram of an electric circuit of the detector shown in FIGS. 13A, 13B and 13C; and FIG. 15 is a cross-sectional view of an optical system for manufacturing a hologram used in the automatic focussing device shown in FIG. 11.

DETAILED DESCRIPTION OF THE INVENTION

Figure 1:
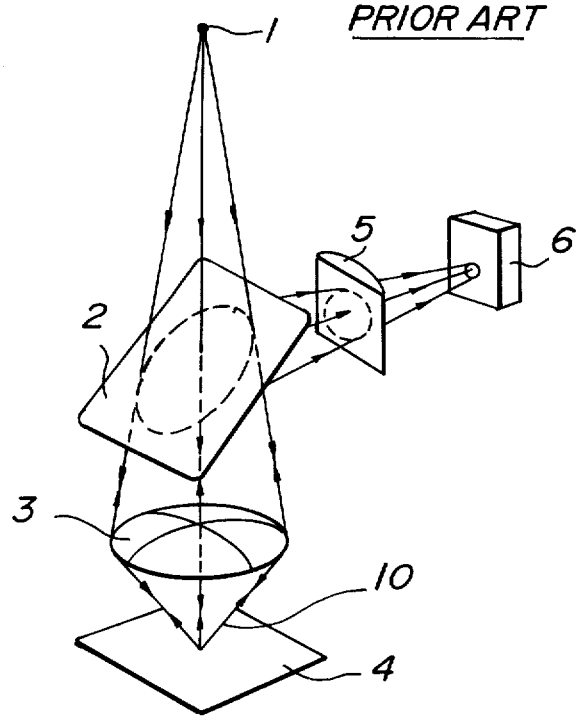
FIG. 1 is a perspective view of a conventional automatic focussing device which makes use of an optical system having astigmatism.

FIG. 1 is a perspective view of a conventional automatic focussing device which makes use of a cylindrical lens for the purpose of producing astigmatism.

A luminous flux emerged from a light source 1 passes through a half mirror 2 and objective lens 3 and is converted onto a video disc surface 4. A luminous flux 10 reflected by the video disc surface 4 passes through the objective lens 3, half mirror 2 and a cylindrical lens 5. A luminous flux emerged from the cylindrical lens 5 and having astigmatism is converged onto a detector 6.

If the position of the video disc surface 4 is changed, the astigmatism of the luminous flux incident on the detector 6 causes the configuration of the image produced on the detector 6 to change. If such change of the configuration of the image produced on the detector 6 is detected, it is possible to detect the positional change of the video disc surface 4.

Figure 2:
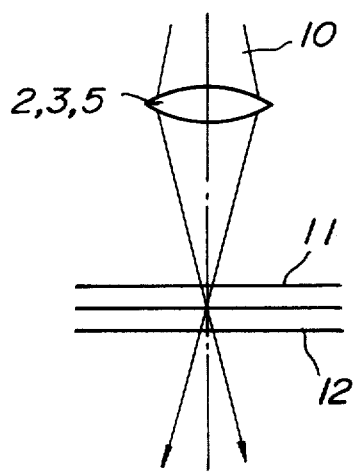
FIG. 2 is a cross-sectional view of one example of a position of a meridional image surface and sagittal image surface of a luminous flux passed through an optical system having astigmatism.

In FIG. 2, a convex lens 2, 3, 5 represents the half mirror 2, objective lens 3 and cylingrical lens 5 shown in FIG. 1. If a luminous flux 10 reflected by the video disc surface 4 (FIG. 1) is incident on the convex lens 2, 3, 5, the luminous flux 10 is not converged onto one point, but becomes a luminous flux which is segment-shaped in section at a meridional image plane 11 and sagittal image plane 12, respectively. The luminous flux 10 becomes elliptical in section in front and rear of these meridional and sagittal image planes 11 and 12, respectively, as shown in FIG. 3.

Figure 3:
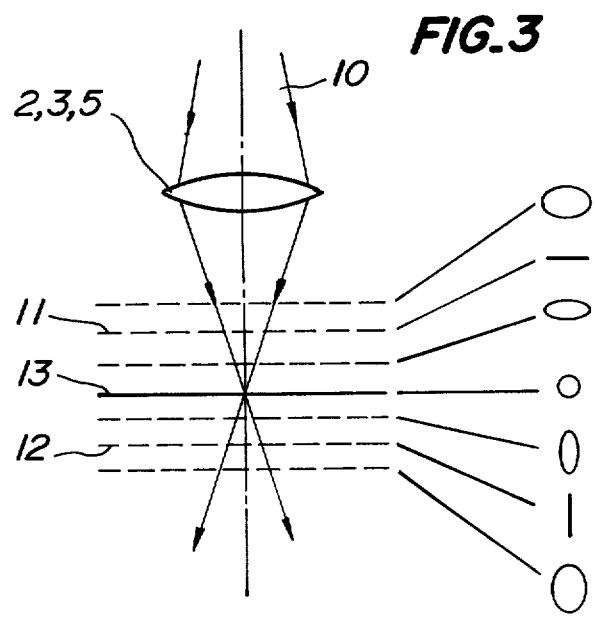
FIG. 3 is a cross-sectional view of a luminous flux passed through an optical system having astigmatism.

In FIG. 3, the sectional configurations of the luminous flux emerged from the convex lens 2, 3, 5 and located at respective image planes shown in dotted and full lines are shown at the right side of FIG. 3. As seen from FIG. 3, the sectional configurations of the luminous flux 10 located at the meridional image plane 11 and sagittal image plane 12 are segment-shaped, respectively. In practice, however, these sectional configurations are not always limited to segment-shaped owing to aberrations other than astigmatism. In the intermediate between these meridional and sagittal image planes 11, 12, there is a plane 13 where the sectional configuration of the luminous flux 10 becomes substantially circular. This plane 13 will hereinafter be called as an optimum image forming plane.

In FIG. 1, if a distance between the optical system 2, 3, 5 and the video disc surface 4 is changed, the luminous flux 10 reflected by the video disc surface 4 becomes different in divergence, thereby displacing the above described image planes.

In FIG. 1, let it be assumed that the detector 6 is located at the optimum image forming position 13 (FIG. 3) when the video disc surface 4 is located at a given position with respect to the optical system 2, 3, 5, that is, located at such positions that the light image on the video disc surface 4 becomes a point. In this case, if the video disc surface 4 is located at the given position, the image produced on the detector 6 becomes substantially circular. On the contrary, if the video disc surface 4 is deviated from the given position, the image produced on the detector 6 becomes changed as shown in FIG. 3.

As a result, if the optical system 2, 3, 5 is operated such that the image produced on the detector 6 is always circular, it is always possible to locate the video disc surface 4 at a given position with respect to the optical system 2, 3, 5.

Figures 4A, 4B, 4C:
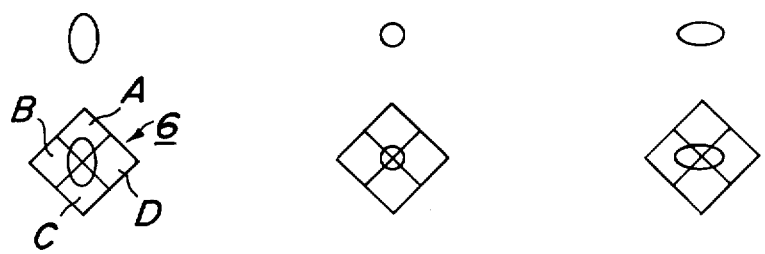
FIGS. 4A, 4B and 4C are front elevational views of one example of a detector for detecting an astigmatic image.

FIGS. 4A, 4B and 4C show one example of the detector 6 for detecting the change of the optical image shown in FIG. 3. The detector 6 shown in FIG. 4 is provided with four light receiving regions A, B, C, D which function to independently detect the quantity of light incident thereon. Let it be assumed that the center of the detector 6 is made coincident with an optical axis of the optical system 2, 3, 5. Then, if the video disc surface 4 is deviated from its given position in one direction with respect to the optical system 2, 3, 5, a vertical elliptical image is produced on the detector 6 as shown in FIG. 4A. On the contrary, if the video disc surface 4 is deviated from its given position in the opposite direction with respect to the optical system 2, 3, 5, a horizontal elliptical image is produced on the detector 6 as shown in FIG. 4C. In both cases, the quantity of light incident on the regions A, C becomes different from the quantity of light incident on the regions B, C.

If the video disc surface 4 is located at a given position, a circular image is produced on the detector 6 as shown in FIG. 4B and the quantity of light incident on the regions A, C becomes substantially equal to the quantity of light incident on the regions B, D.

Figure 5:
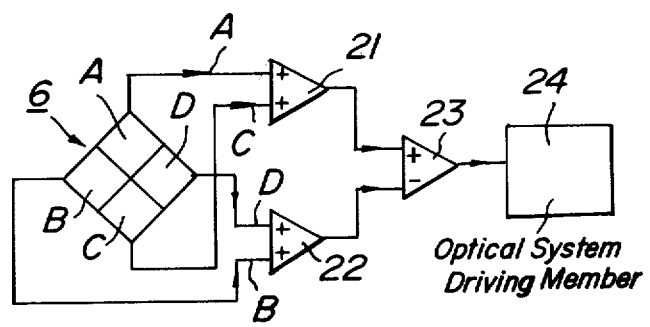
FIG. 5 is a block diagram of an electric circuit of the detection shown in FIGS. 4A, 4B and 4C.

FIG. 5 shows a block diagram of an electrical circuit for treating output signals delivered from the detector 6 shown in FIGS. 4A, 4B, 4C. In FIG. 5, A to D designate outputs from the four light receiving regions A to D, respectively. As shown in FIG. 5, the output signals A, C are supplied to an amplifier 21 which delivers an output corresponding to A+C. Similarly, the output signals B, D are supplied to an amplifier 22 which delivers an output corresponding to B+D. These signals A+C and B+D are supplied to a differential amplifier 23 which delivers an output corresponding to (A+C)−(B+D) to an optical system driving member 24.

If the optical system 2, 3, 5 is driven to change the distance from the video disc surface 4 to the optical system 2, 3, 5, the image produced on the detector 6 becomes changed as shown in FIGS. 4A, 4C. The output (A+C)−(B+D) from the differential amplifier 23 becomes positive under the condition shown in FIG. 4A, becomes negative under the condition shown in FIG. 4C and becomes zero under the condition shown in FIG. 4B. As a result, if the output from the differential amplifier 23 is negatively fedback to its input, the optical system driving member 24 becomes stopped when the video disc surface 4 is located at its given position and hence the image produced on the detector 6 is located at its optimum image forming surface 13 shown in FIG. 3 under the condition shown in FIG. 4B. Alternatively, the differential amplifier 23 may be offset such that the optical system driving member 24 is stopped when the output (A+C)−(B+D) from the differential amplifier 23 becomes a given level.

FIG. 6 is a graph which illustrates the relation between the output (A+C)−(B+D) from the differential amplifier 23 shown in FIG. 5 on the one hand and the distance between the optical system 2, 3, 5 and the video disc surface 4 on the other hand.

As described above, it is always possible to locate the video disc surface 4 at its given position with respect to the optical system 2, 3, 5 and to converge the incident luminous flux onto the video disc surface 4. Such conventional automatic focussing device has a number of disadvantages. In the first place, the position in the optical axis of the detector 6 must be coincident with a point near the optimum image forming surface 13 shown in FIG. 3 and such adjustment of the detector 6 is of critical one and not flexible. Secondly, in order to improve the focal point detection sensitivity, the astigmatic difference due to the above mentioned astigmatism must be made extremely small and hence it is a matter of course that the optical image produced on the detector 6 becomes considerably small, and as a result, the position of the detector 6 in the direction perpendicular to the optical axis must also be precisely adjusted. Third, if the light image produced on the detector 6 becomes considerably small, such considerably small light image enters into an insensitive region of the detector 6, and hence the detection sensitivity of the detector 6 becomes degraded. Finally, the dynamic range within which the focal point is adjusted at the video disc surface 4 must be enlarged by an order of $\pm 30\mu$ to $\pm 50\mu$, thereby degrading the sensitivity of adjusting the focal point. That is, if use is made of an objective lens having a magnification 20× for the purpose of reading out the video disc signal, the out of focussing must be made on the order of $\pm 2\mu$.

Another automatic focussing device in which a luminous flux having astigmatism is converged onto a video disc surface has also been proposed. Such conventional automatic focussing device has the disadvantage that the light image converged onto the video disc surface becomes enlarged owing to the astigmatism and hence the luminous flux reflected by such enlarged light image is unsuitable for reading out the video disc surface.

FIG. 7 shows one embodiment of an automatic focussing device according to the invention. In the present embodiment, use is made of a hologram 40 prepared by a manufacturing optical system to be described later. In the present embodiment, a laser light 41 is incident on the hologram 40 from which are emerged a substantially parallel focussing luminous flux 42 having astigmatism, for example, a positive primary diffraction light as shown by dotted lines and a parallel reading out luminous flux 43 having no astigmatism, for example, a zero order diffraction light as shown by a full line, respectively.

The focussing luminous flux 42 is reflected by a half mirror 44 and incident on a relay lens 45 which causes the incident light to converge onto an image side focal plane 46. Since the focussing luminous flux 42 has astigmatism, the incident light onto the relay lens 45 is converged onto its image side focal plane 46 with an astigmatic difference $\Delta l$. The focussing luminous flux 42 is prepared such that the optimum image forming plane is coincident with the focal plane 46 of the relay lens 45 to be described later.

Then, the focussing luminous flux 42 is reflected by a tracking mirror 47 and passes through an objective lens 48 and is incident on a video disc surface 49. The above mentioned image side focal plane 46 of the relay lens 45 and the video disc surface 49 are made substantially conjugate with respect to the objective lens 48. As a result, the focussing luminous flux 42 is converged onto the video disc surface 49. It is a matter of course that the convergence of the focussing flux 42 onto the video disc surface 49 is effected under the presence of astigmatism, and that the configuration of the light image produced on the video disc surface 49 becomes circular, elliptical or segment. The astigmatic difference of the convergence of the focussing luminous flux 42 is given by $\Delta l/\alpha$, where $\alpha$ is a magnification of the objective lens 48. In the present embodiment, $\alpha = 20$ and $\Delta l = 1.6$ mm.

The luminous flux reflected by the video disc surface 49 again passes through the objective lens 48 and is reflected by the tracking mirror 47. The objective lens 48 causes the luminous flux reflected by the video disc surface 49 to converge onto a point near the image side focal plane 46 of the relay lens 45, the sectional configuration of the converged luminous flux being circular, elliptical or segment-shaped. Then, the luminous flux passes through the relay lens 45 to produce a substantially parallel luminous flux whose sectional configuration corresponds to the sectional configuration at the focal plane 46, that is, a luminous flux having a considerably large astigmatism. This luminous flux passes through the half mirror 44 and is incident on a focal point detecting element 50.

As can be seen from the above, if the distance between the video disc surface 49 and the optical system inclusive of the objective lens 48 or the like is changed, the configuration of the light image produced on the video disc surface 49 becomes changed. As a result, the sectional configuration of the luminous flux incident on the focal point detecting element 50 becomes changed in response to the change of the configuration of the light image produced on the video disc surface 49. The change of the sectional configuration of the luminous flux incident on the focal point detecting element 50 can be used to adjust the focal point of the optical system 48.

It is a matter of course that the relay lens 45 also causes the above mentioned reading out luminous flux 43 to converge onto the image side focal plane 46 of the relay lens 45 which is in coincidence with the optimum image forming plane of the focussing luminous flux 42. Similarly, that plane which is located near the video disc surface 49 and onto which is converged the reading out luminous flux 43 is coincident with the optimum image forming plane of the focussing luminous flux.

As described above, the focussing luminous flux 42 is the primary diffraction light which is deviated from the reading out luminous flux 43 by a small angle, so that two light spots produced on the video disc surface 49 are slightly displaced from each other and hence not overlapped one upon the other, thereby effecting the reading out operation without any hindrance.

As seen from the above, if the video disc surface 49 is always placed on its optimum image forming surface, the reading out luminous flux 43 is converged onto the video disc surface 49. If the video disc surface 49 is coincident with its optimum image forming plane, the optical image produced on the video disc surface 49 by the focussing luminous flux 42 becomes circular in section. At the same time, the sectional configuration of the focussing luminous flux 42 on the image side focal plane 46 of the relay lens 45 becomes also circular.

As described above, the luminous flux produced at the side of the focal point detecting element 50 by the relay lens 45 is substantially parallel luminous flux whose sectional configuration is substantially the same as that produced at the focal plane at the image side of the relay lens 45, particularly a luminous flux having a considerably large astigmatism, and as a result, the light image produced on the focal point detecting element 50 is substantially circular.

If the video disc surface 49 is deviated from the above mentioned desired position, the configuration of the optical image produced on the video disc surface 49 by the focussing luminous flux 42 is also changed, and as a result, the configuration of the image produced on the detecting element 50 becomes changed as shown in FIGS. 4A, 4B and 4C. The change of such configuration of the image produced on the detecting element 50 can be used for the purpose of effecting the automatic focussing in the conventional manner. In this case, the reading out luminous flux 43 passes through a light path shown by a full line and then is incident on a video signal reading out element 51 so as to read out the video signal.

The hologram 40 for producing the above mentioned two luminous fluxes may be manufactured by an optical system shown in FIG. 8. In the present optical system, a parallel object luminous flux 60 emerged from a collimator lens (not shown) passes through an optical system composed of a convex lens 61 and a cylindrical lens 62 and having astigmatism and is converged. The optical system 61, 62 is constructed such that an astigmatic difference becomes $\Delta l$. A relay lens 64 having a focal distance f which is the same as that of the relay lens 45 shown in FIG. 7 is arranged such that the optimum image forming plane 63 is coincident with the focal plane of the relay lens 64. A substantially parallel luminous flux emerged from the relay lens 64 passes through a half mirror 65 and is incident on a photosensitive body 66 with an incident angle $\theta$.

At the same time, a parallel reference luminous flux 67 emerged from a collimator lens (not shown) passes through the half mirror 65 and is incident on the photosensitive body 66 in a direction perpendicular thereto. As a result, an interference fringe is recored on the photosensitive body 66, thereby producing the hologram 40 shown in FIG. 7. As described with reference to FIG. 7, if the reproduction laser light 41 is incident on the hologram 40, it is possible to obtain the desired signal reading out luminous flux 43 and focussing luminous flux 42.

As can be seen from the embodiment described with reference to FIG. 7, the automatic focussing device according to the invention has a number of advantages. In the first place, the luminous flux having astigmatism is used as the focussing luminous flux, so tht the astigmatic difference at the video disc surface becomes $\Delta l/\alpha$. Even though the astigmatic difference $\Delta l/\alpha$ is made small in order to effect precise focussing, it is possible to make the astigmatic difference at the focal plane 46 of the relay lens 45 $\Delta l$ which is larger than $\Delta l/\alpha$, thereby rendering it possible to detect the focal point in an easy manner. Secondly, the focussing luminous flux 42 is separated from the reading out luminous flux 43, so that it is possible to use as the reading out luminous flux 43 a luminous flux without having astigmatism and having a good quality. Third, use is made of the hologram 40 to produce the focussing luminous flux 42 and reading out luminous flux 43, so that the optical system becomes simple in construction and that the hologram 40 is reproducible and hence less expensive. Fourth, the use of relay lens 45 causes the astigmatic difference at the side of the focal point detecting element 50 to increase to a substantially infinitely large value, so that the focal point detecting element 50 can freely be located in the optical axis direction without requiring any critical positional adjustment. Finally, the dimension of the focussing luminous flux 42 can be made large at the side of the focal point detecting element 50, so that the focal point detecting element 50 can easily adjust in a direction perpendicular to the optical axis and that the focal point detecting element 50 may be made large in size.

The invention is not limited to the above described embodiment only, but various modifications and alternations are possible. In addition, provision may be made of a hologram which can not only produce the focussing luminous flux 42 and video signal reading out luminous flux 43, but also produce a tracking luminous flux.

FIG. 9A illustrates a photosensitive body to be manufactured into the hologram which can also produce the tracking luminous flux. In the present embodiment, a reference luminous flux 70 and a focussing luminous flux 73 pass through the optical system shown in FIG. 8 and are incident on a photosensitive body 74 and at the same time parallel tracking luminous fluxes 71, 72 is incident on the photosensitive body 74, the parallel tracking luminous fluxes 71, 72 being located in a plane perpendicular to the plane inclusive of the reference luminous flux 70 and focussing luminous flux 73 and inclined at an angle of $\pm\phi$ with respect to the former plane. As a result, an interference fringe is recorded on the photosensitive body 74, thereby producing a hologram 74 shown in FIG. 9B.

As shown in FIG. 9B, if a reproduction luminous flux 41 is incident on the hologram 74, a video signal reading out luminous flux 75, focussing luminous flux 76 and tracking luminous fluxes 77, 78 are emerged from the hologram 74.

FIG. 10A shows another embodiment of an automatic focussing device according to the invention which makes use of the hologram 74 shown in FIG. 9B. The construction of the present embodiment is substantially the same as that of the previous embodiment shown in FIG. 7. However, in the present embodiment, the tracking luminous fluxes 77, 78 emerged from the hologram 74 are converged onto the both sides of a video signal track 80 as shown in FIG. 10B and the light reflected is detected by tracking detecting elements 81, 82 so as to drive the objective lens 48 such that the video signal reading out luminous flux 75 is not deviated from the video signal track 80.

In addition, the construction of the focal point detecting element 50 is not limited to that shown in FIG. 4A, but various other constructions thereof may be conceivable.

The invention is capable of locating the focal point detecting element 50 in a relatively free manner, obviating the necessity of effecting the critical adjustment thereof and improving the focal point detecting precision.

Figure 11:
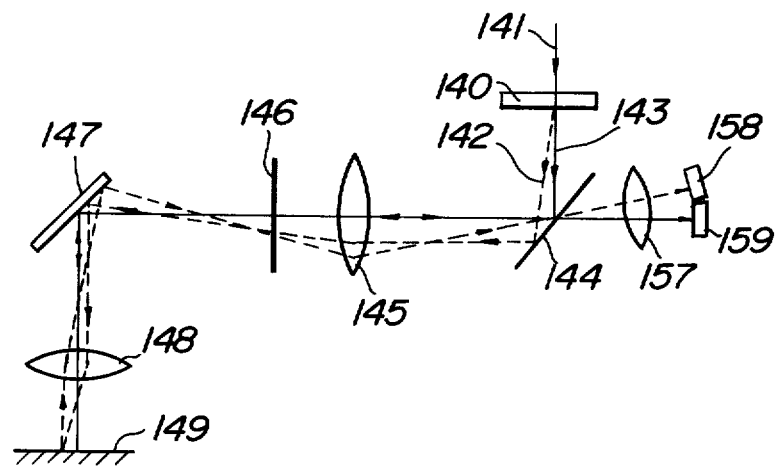
FIG. 11 is a cross-sectional view of a further embodiment of an automatic focussing device according to the invention.

FIG. 11 shows a further embodiment of an automatic focussing device according to the invention. In the present embodiment, use is made of a hologram 140 prepared by a manufacturing optical system to be described later. In the present embodiment, a laser light 141 is incident on the hologram 140 from which are emerged a substantially parallel focussing luminous flux 142 having astigmatism and coma, for example, a positive primary diffraction light as shown by dotted lines and a parallel reading out luminous flux 143 having no astigmatism and coma, for example, a zero order diffraction light as shown by a full line, respectively.

The focussing luminous flux 142 is reflected by a half mirror 144 and incident on a relay lens 145 which causes the incident light to converge onto an image side focal plane 146. Since the focussing luminous flux 142 has astigmatism and coma, the incident light onto the relay lens 145 is converged onto its image side focal plane 146 with an astigmatic difference $\Delta l$.

In the present embodiment, the hologram 140 and the relay lens 145 are constructed such that the intermediate image forming plane is coincident with the focal plane 146 of the relay lens 145 under the condition that the strength distribution of the focussing luminous flux 142 becomes reversed in a direction perpendicular to the drawing plane inclusive of the optical axis in a plane perpendicular to the optical axis to be described later.

Then, the focusing luminous flux 142 is reflected by a tracking mirror 147 and passes through an objective lens 148 and is incident on a video disc surface 149. The above mentioned image side focal plane 146 of the relay lens 145 and the video disc surface 149 are made substantially conjugate in position with respect to the objective lens 148. As a result, the focussing luminous flux 142 is converged onto the video disc surface 149. It is a matter of course that the convergence of the focussing flux 142 onto the video disc surface 149 is effected under the presence of astigmatism and coma, and that the configuration of the light image produced on the video disc surface 149 becomes changed in dependence with the change of distance between the objective lens 148 and the video disc surface 149.

Figure 12:
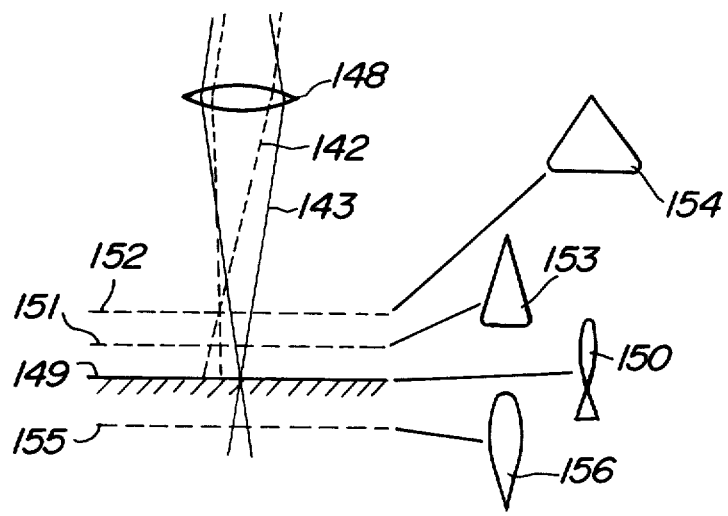
FIG. 12 is a cross-sectional view of a luminous flux passed through an optical system having astimatism and coma.

If the image side focal plane 146 of the relay lens 145 and the video disc surface 149 are conjugate in position with respect to the objective lens 148, that is, if the reading out luminous flux 143 is correctly converged onto the video disc surface 149, the light image produced on the video disc surface 149 by means of the focussing luminous flux 142 becomes a configuration shown by reference numeral 150 in FIG. 12. If the video disc surface 149 approaches to the objective lens 148 and is located at surfaces 151 and 152 shown by dotted lines, the light images produced on the video disc surface 149 by means of the focussing luminous flux 142 become patterns shown by reference numerals 153 and 154 in FIG. 12, respectively. If the video disc surface 149 is distant apart from the objective lens 148 and is located at a surface 155 shown by dotted lines in FIG. 12, the light image produced on the video disc surface 149 by means of the focussing luminous flux 142 becomes a pattern shown by a reference numeral 156 in FIG. 12.

In FIG. 11, the astigmatic difference of the light image produced on the video disc surface 149 by means of the focussing luminous flux 142 if given by $\Delta l/\alpha$, where $\alpha$ is a magnification of the objective lens 148. In the present embodiment, $\alpha = 20$ and $\Delta l = 1.6$ mm.

The luminous flux reflected by the video disc surface 149 again passes through the objective lens 148 and is reflected by the tracking mirror 147. The objective lens 148 causes the luminous flux reflected by the video disc surface 149 to converge onto a point near the image side focal plane 146 of the relay lens 145, the sectional configurations of the converged luminous flux being changed into the various patterns designated by reference numerals 150, 153, 154, 156 in FIG. 12, respectively. Then, the luminous flux passes through the relay lens 145 to produce a substantially parallel luminous flux whose sectional configuration corresponds to the sectional configuration at the focal plane 146, that is, a luminous flux having a considerably large astigmatic difference. This luminous flux passes through the half mirror 144 and a condenser lens 157 and is incident on a focal point detecting element 158.

As can be seen from the above, if the distance between the video disc surface 149 and the optical system inclusive of the objective lens 148 or the like is changed, the configuration of the light image produced on the video disc surface 149 becomes changed. As a result, the sectional configuration of the luminous flux incident on the focal point detecting element 158 becomes changed in response to the change of the configuration of the light image produced on the video disc surface 149. The change of the sectional configuration of the luminous flux incident on the focal point detecting element 158 can be used to adjust the focal point of the optical system 148.

It is a matter of course that the relay lens 145 also causes the above mentioned reading out luminous flux 143 to converge onto the image side focal plane 146 of the relay lens 145 which is in coincidence with the optimum image forming plane of the focussing luminous flux 142. Similarly, that plane which is located near the video disc surface 149 and onto which is converged the reading out luminous flux 143 is concident with the optimum image forming plane 146 of the focussing luminous flux 142.

As described above, the focussing luminous flux 142 is the primary diffraction light which is deviated from the reading out luminous flux 143 by a small angle, so that two light spots produced on the video disc surface 149 are slightly displaced from each other and hence are not overlapped one upon the other, thereby effecting the reading out operation without any hindrance.

As a result, if the sectional configuration of the focussing light flux 142 produced on the video disc surface 149 is brought into agreement with a given pattern, it is possible to correctly converge the reading out luminous flux 143 onto the video disc surface 149.

In the present embodiment, if the video disc surface 149 is coincident with its optimum image forming plane, the sectional configuration of the light image produced on the video disc surface 149 by the focussing luminous flux 142 becomes the pattern 150 shown in FIG. 12. At the same time, the sectional configuration of the focussing luminous flux 142 produced on the image side focal plane 146 of the relay lens 145 becomes also the same pattern as the pattern 150.

The luminous flux emerged from the relay lens 145 is substantially parallel luminous flux whose sectional configuration is substantially the same as that produced at the image side focal plane of the relay lens 145, particularly a luminous flux having a considerably large astigmatic difference, and as a result, the light image produced on the focal point detecting element 158 has substantially the same pattern as the pattern 150 shown in FIG. 12.

If the video disc surface 149 is deviated from the above mentioned desired position, the configuration of the optical image produced on the video disc surface 149 by the focussing luminous flux 142 is also changed, and as a result, the configuration of the image produced on the focus point detecting element 158 becomes changed as shown in FIG. 12. The change of such configuration of the image produced on the focus point detecting element 158 can be used for the purpose of effecting the automatic focussing in the conventional manner. In this case, the reading out luminous flux 143 passes through a light path shown by a full line and then is incident on a video signal reading out element 159 so as to read out the video signal.

FIGS. 13A, 13B and 13C show one example of the focal point detecting element 158 for detecting the change of the optical image of the focussing luminous flux 142. The focal point detecting element 158 shown in FIGS. 13A, 13B and 13C is provided with two light receiving regions A and B which function to independently detect the quantity of light incident thereon. The focal point detecting element 158 is arranged such that if the video disc surface 149 is in focus with the reading out luminous flux 143, the quantity of light incident on the regions A and B and passed through the pattern 150 becomes equal with each other.

As a result, in FIG. 11, if the video disc surface 149 approaches to the objective lens 148, the pattern 153 shown in FIG. 13A is produced, while if the video disc surface 149 becomes distant apart from the objective lens 148, the pattern 156 shown in FIG. 13C is produced. In both cases, the quantity of light incident on the regions A and B becomes different from each other.

FIG. 14 shows a block diagram of an electrical circuit for treating output signals delivered from the focal point detecting element 158 shown in FIGS. 13A, 13B, 13C. In FIG. 14, A and B designate outputs from the two light receiving regions A and B of the focal point detecting element 158, respectively. As shown in FIG. 14, the output signals A and B are supplied to a differential amplifier 160 which functions to deliver an output corresponding to A-B to an optical system driving member 161. The optical system driving member 161 functions to displace the objective lens 148 shown in FIG. 11 in a direction of its optical axis in response to the output from the differential amplifier 160. As a result, the image on the focal point detecting element 158 is changed as shown in FIGS. 13A, 13B and 13C. The output (A−B) from the differential amplifier 160 becomes negative under the condition shown in FIG. 13A, becomes positive under the condition shown in FIG. 13C and becomes zero under the condition shown in FIG. 13B. As a result, if the output from the differential amplifier 160 is negatively fedback to its input, the optical system driving member 161 becomes stopped when the video disc surface 149 is in focus with the reading out luminous flux 143, that is, under the condition shown in FIG. 13B. Alternatively, the differential amplifier 160 may be offset such that the optical system driving member 161 is stopped when the output (A−B) from the differential amplifier 160 becomes a given level.

The hologram 140 for producing the above mentioned two luminous fluxes 142, 143 shown in FIG. 11 may be manufactured by an optical system shown in FIG. 15. In the present optical system, a parallel object luminous flux 162 emerged from a collimator lens (not shown) passes through a convex lens 163 inclined to a direction perpendicular to its optical axis by an angle δ and having astigmatism and coma and is converted. The optical system 163 is constructed such that an astigmatic difference becomes Δl. A relay lens 165 having a focal distance which is the same as that of the relay lens 145 shown in FIG. 11 is arranged such that the optimum image forming plane 164 is coincident with that position of the video disc surface 149 where the optical image whose sectional configuration has the pattern 150 shown in FIG. 12. A substantially parallel luminous flux emerged from the relay lens 165 passes through a half mirror 166 and is incident on a photosensitive body 167 with an incident angle θ.

At the same time, a parallel reference luminous flux 168 emerged from a collimator lens (not shown) is reflected by the half mirror 166 and is incident on the photosensitive body 167 in a direction perpendicular thereto. As a result, an interference fringe is recorded on the photosensitive body 167, thereby producing the hologram 140 shown in FIG. 11. As described with reference to FIG. 11, if the reproduction laser light 141 is incident on the hologram 140, it is possible to obtain the desired signal reading out luminous flux 143 and the focusing luminous flux 142.

In the embodiment shown in FIG. 11, the luminous flux having astigmatism and coma is used as the focussing luminous flux, so that the astigmatic difference at the video disc surface 149 becomes $\Delta l/\alpha$. As a result, the present embodiment has the number of advantages which are the same as those described with reference to the embodiment shown in FIG. 7.

What is claimed is:

1. An automatic focussing device comprising
   a hologram for producing a luminous flux having a considerably large astigmatism with or without coma;
   a relay lens for converging said luminous flux with an astigmatic difference $\Delta l$ and having an optimum image forming plane;
   a video disc surface to be recorded or reproduced;
   an objective lens arranged between said optimum image forming plane and said video disc surface and converging said luminous flux as a focussing luminous flux with a small astigmatic difference onto said video disc surface, said optimum image forming surface and said video disc surface being conjugate in position with respect to said objective lens; and
   a focussing light receiving element on which is incident a light reflected by said video disc surface and passed through said objective lens and relay lens as a luminous flux having a considerably large astigmatic difference.

2. The device according to claim 1 wherein said hologram for producing a luminous flux having a considerably large astigmatism with or without coma is a hologram recorded thereon with an object luminous flux and reference flux and producing a focussing luminous flux and video signal reading out luminous flux.

3. The device according to claim 2 wherein said hologram is recorded thereon with an object luminous flux converged through an optical system having astigmatism with or without coma, passed through a relay lens having a focal plane located at an optimum image forming plane intermediate between a meridional image plane and a sagittal image plane and incident on a photosensitve body with a suitable incident angle θ and at the same time recorded thereon with a reference luminous flux incident on said photosensitive body in a direction perpendicular thereto.

4. The device according to claim 1 wherein said hologram for producing a luminous flux having a considerably large astigmatism with or without coma is a hologram composed of a photosensitive body recorded thereon with an object luminous flux and reference flux and at the same time with tracking luminous flux and producing a focussing luminous flux, video signal reading out luminous flux and at the same time tracking luminous flux.

5. The device according to claim 4 wherein said hologram is composed of a photosensitive body recorded thereon with an object luminous flux and reference luminous flux and at the same time with a tracking luminous flux located in a plane inclusive of said reference luminous flux.

* * * * *